US007199814B2

(12) United States Patent
Rodin et al.

(10) Patent No.: US 7,199,814 B2
(45) Date of Patent: Apr. 3, 2007

(54) DIRECT WRITE HOLOGRAPHIC PRINTER

(75) Inventors: Alexey Rodin, Vilnius (LT); Florian Michel Robert Vergnes, Pease Pottage (GB); David Brotherton-Ratcliffe, Pease Pottage (GB)

(73) Assignee: XYZ Imaging, Inc., Montreal, Quebec (CA)

( * ) Notice: Subject to any disclaimer, the term of this patent is extended or adjusted under 35 U.S.C. 154(b) by 0 days.

(21) Appl. No.: 10/398,344

(22) PCT Filed: Oct. 8, 2001

(86) PCT No.: PCT/GB01/04453

§ 371 (c)(1),
(2), (4) Date: Oct. 24, 2003

(87) PCT Pub. No.: WO02/29500

PCT Pub. Date: Apr. 11, 2002

(65) Prior Publication Data

US 2004/0050280 A1    Mar. 18, 2004

(30) Foreign Application Priority Data

Oct. 6, 2000 (GB) ................... 0024533.2

(51) Int. Cl.
*B41J 2/435* (2006.01)
*H01S 3/10* (2006.01)
(52) U.S. Cl. ........................ 347/232; 372/23
(58) Field of Classification Search ........... 347/224, 347/232–233, 238–239, 237; 219/121.7; 345/84; 372/21–25, 10, 18–19, 29.022, 92–98, 372/107–108, 29.02–32, 70–72; 359/3, 9, 359/19, 22–23, 27, 30, 35
See application file for complete search history.

(56) References Cited

U.S. PATENT DOCUMENTS 3,818,129 A    6/1974  Yamamoto ............... 178/7.3 D
4,338,578 A *  7/1982  Sukhman ................... 372/23

(Continued)

FOREIGN PATENT DOCUMENTS

DE    19809402     2/1999
EP    0355274      2/1990
WO    WO98/26328   6/1998

OTHER PUBLICATIONS

E. Lafond et al.; *Optimization of a single mode Q-switched oscillator at 1.34μm*, Optics Communications 152, Jul. 1, 1998, pp. 329-334.

*Primary Examiner*—Hai Pham
(74) *Attorney, Agent, or Firm*—Madan, Mossman & Sriram, P.C.

(57) ABSTRACT

A direct write holographic printer for producing RGB color reflection holograms is disclosed. A Nd:YLF crystal (1) in a laser cavity is excited to produce an emission at 1313 nm which is frequency converted by doubling to 656.5 nm and by tripling to 437.7 nm. In a separate cavity a similar Nd:YLF crystal (1a) is synchronously or asynchronously excited to produce an emission at 1047.1 nm (or at the related line of 1053 nm) which is frequency converted by doubling to 523.6 nm (or 526.5 nm). The emissions at 437.7 nm and 656.5 nm are combined co-linearly with the emission at 523.6 nm (or 526.5 nm) to produce a single RGB pulsed laser beam.

30 Claims, 6 Drawing Sheets

U.S. PATENT DOCUMENTS

| | | | |
|---|---|---|---|
| 4,866,720 A * | 9/1989 | Holly | 372/23 |
| 4,907,034 A | 3/1990 | Doi et al. | 355/400 |
| 5,022,727 A | 6/1991 | Smith et al. | 350/3.76 |
| 5,046,792 A | 9/1991 | Zabka | 359/26 |
| 5,121,402 A | 6/1992 | Scheps | 372/70 |
| 5,151,714 A | 9/1992 | Okino et al. | 347/232 |
| 5,265,108 A | 11/1993 | Benda | 372/18 |
| 5,295,143 A | 3/1994 | Rao et al. | 372/22 |
| 5,317,577 A * | 5/1994 | Urakami et al. | 372/21 |
| 5,740,190 A * | 4/1998 | Moulton | 372/23 |
| 5,802,086 A * | 9/1998 | Hargis et al. | 372/22 |
| 5,894,489 A | 4/1999 | Halldorsson et al. | 372/23 |
| 6,002,704 A | 12/1999 | Freitag et al. | 372/94 |
| 6,009,110 A * | 12/1999 | Wiechmann et al. | 372/10 |
| 6,199,794 B1 | 3/2001 | Naiman et al. | 244/3.16 |
| 6,304,237 B1 * | 10/2001 | Karakawa | 345/84 |
| 6,330,088 B1 * | 12/2001 | Klug et al. | 359/23 |
| 6,541,731 B2 * | 4/2003 | Mead et al. | 219/121.7 |
| 6,982,817 B1 * | 1/2006 | Halldorsson | 359/22 |
| 7,003,004 B2 * | 2/2006 | Rodin et al. | 372/23 |

* cited by examiner

FIG.1 - Prior Art

DIRECT WRITE HOLOGRAPHIC PRINTER

The present invention relates to a direct write holographic printer.

Previous work on multiple colour pulsed lasers has been concentrated in two fields. The first is holographic interferometry and the second is military target designation. U.S. Pat. No. 3,818,372 describes a pulsed Ruby laser that can be operated at two wavelengths and that has applications in holographic interferometry. This laser, however, is based on the principle of mechanically changing the rear mirror in order to produce different wavelength emissions. As a consequence, the time between the different wavelength emissions is large.

U.S. Pat. No. 6,078,606 describes a general method for obtaining multiple colour laser pulse emissions at controllable interpulse separations that may reach zero. The class of lasers described herein has particular applications in military target designation but may also be useful in holographic interferometry. These lasers are based on the design of a single active laser crystal and multiple cavities. Population inversion depletion by a single wavelength of this active medium is avoided by the stress birefringence effect that also orthogonally polarizes the chromatic emissions in a two-wavelength system.

In the field of holographic printing the lasers which have been employed to date are all continuous wave (CW) lasers. However, severe problems exist concerning the use of CW lasers in such an application due to the inherent sensitivity of the holographic writing process to vibration. The use of CW lasers in commercial holography printing machines therefore results in severe operational problems which limits the operational speed and choice of location.

Holographic printers can be designed to produce several forms of holograms. Some of these forms only require a monochromatic laser. Other forms such as the full-colour reflection hologram require a multiple colour laser for realistic commercial implementation. Until now no commercial holographic printers printing full-colour reflection holograms have appeared on the market. However, some considerable work has been done in the laboratory fabrication of such holograms using CW lasers.

Full-colour reflection holograms are of particular commercial interest. Typically, three component laser emissions are required in a suitable laser corresponding to a red, blue and green signal. The wavelengths of these three primary laser sources must satisfy three conditions. They must firstly fall inside an optimum area of the standard chromaticity chart. Secondly, they must fall inside the same wavelength zone as standard commercial lighting sources and thirdly they must fall inside the area of acceptable human eye sensitivity. Pulsed lasers useful for RGB holography must preferably have Gaussian or quasi-Gaussian beam profiles, plane polarized emissions and a reasonably large temporal coherence length (ranging from 1 mm to 10 m). Different applications warrant various energies, repetition rates and pulse to pulse reproducibilities.

Various CW lasers exist today on an off-the-shelf basis that satisfy these requirements. This is not the case for pulsed lasers.

According to a first aspect of the present invention there is provided a direct write holographic printer as claimed in claim 1.

Further aspects of the present invention are recited by the further independent claims.

In contrast to the prior art, according to the preferred embodiment the various chromatic emissions are able to be synchronous. This is not possible using mechanical manipulation of component optical parts as in U.S. Pat. No. 3,818,372.

Preferably, the chromatic laser emissions fall inside an optimum area of the standard chromaticity chart so that such emissions can be used to produce a wide range of visually perceived colours by selective combination. Further preferably, each chromatic emission falls inside the same wavelength zone occupied by standard commercial lighting sources and that of an acceptable human eye sensitivity. This is not possible with the laser system disclosed in U.S. Pat. No. 6,078,606 for instance.

A yet further preferred feature of the present invention is that the relative energies and pulse lengths of each chromatic emission can be controlled independently and accurately. This is also in contrast to the system disclosed in U.S. Pat. No. 6,078,606.

Advantageously, a preferred aspect of the present invention is that the laser system is capable of reliable single mode, single frequency generation. Accordingly, the pumping of each active medium responsible for a given wavelength emission can preferably be controlled. It is preferred that such pumping is low enough not to induce stress birefringence.

A further preferred feature of the present invention is that it does not use directly the fundamental emissions of the active laser elements, as in both of the examples of prior art given above, but rather uses their second and third harmonics.

According to the preferred embodiment, a Neodymium YLF crystal in a laser cavity is used to produce an emission at 1313 nm that is frequency converted by doubling to 656.5 nm and by tripling to 437.7 nm. In a separate cavity a similar Neodymium YLF crystal is exited to produce an emission at 1053 nm (or at the related line of 1047.1 nm) which is frequency converted by doubling to 526.5 nm (or 523.6 nm). The emissions at 437.7 nm, 526.5 nm and 656.5 nm are combined, preferably co-linearly (or in a less preferred embodiment non co-linearly) so as to produce a single RGB pulsed laser beam.

Various active and passive optical components in the laser are chosen so as to produce an optimum pulse energy ratio between the three wavelengths for a given application. Different designs may be used to attain a variety of pulse durations, energies and various beam parameters as described above and as required, for example, by different holographic printing applications.

In another preferred embodiment the Nd:YLF crystals are replaced by Nd:YAP, Nd:YAG or Nd:BEL and the corresponding atomic transitions in these materials are utilized (Nd:YAG: 1064.2 nm giving 532.1 nm; 1318.8 nm giving 659.4 nm and 439.6 nm; 1338 nm giving 669 nm and 446 nm. Nd:YAP: 1064.3 nm or 1079.6 nm (preferred) or 1099 nm giving either 532.2 nm, 539.8 nm (preferred) or 549.5 nm; 1341.4 nm giving 670.7 nm and 447.1 nm. Nd:BEL: 1070 nm giving 535 nm; 1351 nm giving 675.5 nm and 450.3 nm).

Other embodiments are also contemplated wherein any similar Nd atomic transitions in host matrices of other materials are utilized. As described above laser amplifiers may be used to amplify the fundamental radiation (corresponding to 1313 nm and 1053 nm (or 1047.1 nm) in Nd:YLF) before harmonic conversion and co-linear combination in order to achieve more energetic multiple colour emissions. The Nd:YLF transition line 1321.2 nm may also be used to replace 1313 nm.

Various embodiments of the present invention will now be described, by way of example only, and with reference to the accompanying drawings in which.

Figure 1:
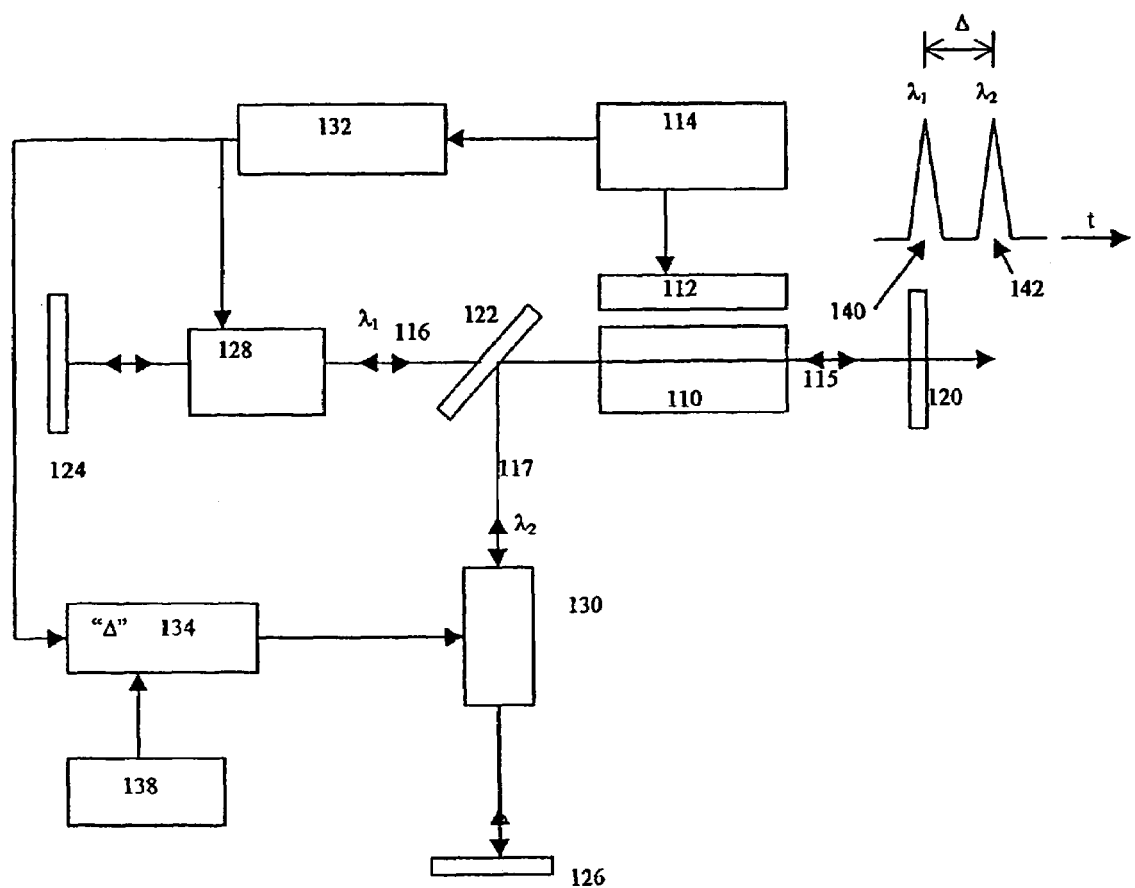
FIG. 1 shows a conventional laser system comprising a single active laser crystal shared between two cavities producing emissions at two fundamental harmonics.

A conventional laser system is shown in FIG. 1. A laser medium 110, such as Nd:YAG, Nd:YLF or Ruby, is pumped by a flash lamp 112 which is driven by a laser excitation driver 114. Two partially overlapping laser cavities are defined by the optical paths 115,116 and 117. The first of these cavities is defined by the optical path determined by the mirrors 120 and 124. The second cavity is determined by mirrors 120 and 126. These cavities partially overlap between the mirror 120 and the beam splitter 122.

Each of the two cavities is tuned to a different characteristic emission wavelength of the active element 110 (i.e. $\lambda_1$ and $\lambda_2$). The optical axis 115 defines the major axis of the system along which laser radiation travels. At one end of the optical axis 115 the mirror 120 is partially reflective at wavelengths $\lambda_1$ and $\lambda_2$. The beam splitting device 122 is placed at a 45 degree angle and is coated to transmit light at $\lambda_1$ and reflect light at $\lambda_2$. Initially the radiation emitted from the laser medium 110 contains both wavelengths. However, due to the length of the cavities and the coatings applied to mirrors 124 and 126 (mirror 124 is coated to be reflective at $\lambda_1$ and mirror 126 is coated to be reflective at $\lambda_2$) only light of one colour ends up propagating in a given cavity ($\lambda_1$ along the optical path 116 and $\lambda_2$ along the optical path 117).

The Q-switches 128 and 130 control the operation of the respective cavities. Laser excitation driver 114 drives a trigger generator 132 which activates the Q-switch 128. The output from the trigger generator 132 is applied to an adjustable delay unit 134 which retards the trigger pulse from the trigger generator 132 by an amount Δ, this amount being controlled by the control unit 138.

In operation the laser excitation driver initiates a lamp flash causing laser medium 110 to develop a population inversion. At the same time the trigger generator 132 triggers the Q-switch 128 causing a spike of radiation 140 at $\lambda_1$ to propagate through elements 122,128,124,128,122,110,120 and out of the laser. After a predetermined time Δ the trigger pulse from trigger generator 132 triggers the Q-switch 130 causing a second spike of radiation 142 at $\lambda_2$ to propagate through elements 122,130,126,130,122,110,120 and out of the laser. In this way a 2-colour pulsed laser beam is produced.

Figure 2:
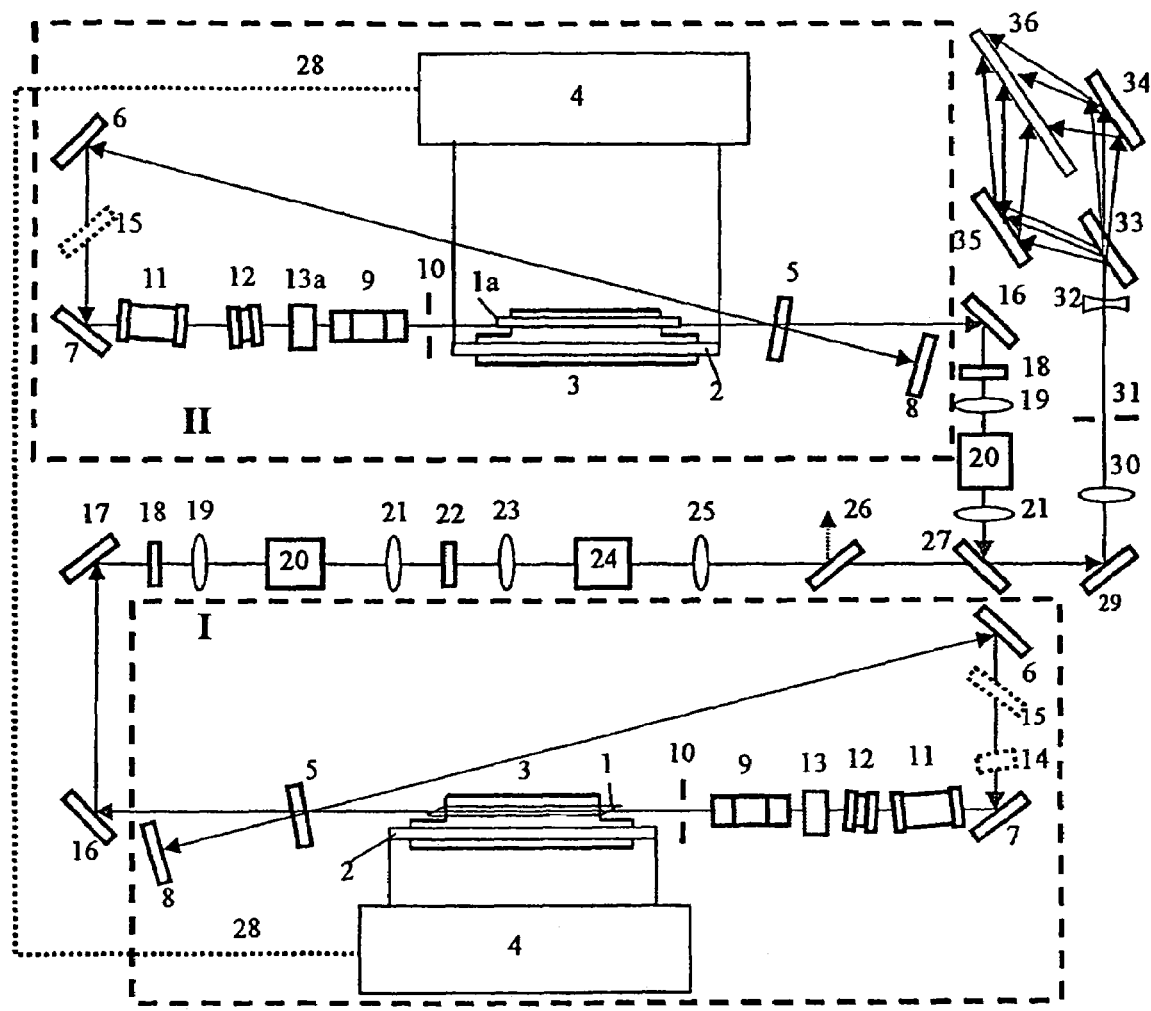
FIG. 2 shows a passively Q-switched single stage single frequency multiple colour Nd:YLF/Nd:YAG laser according to a first embodiment of the present invention.

Passively Q-switched Single-Stage Single Frequency Multiple Colour Nd:YLF/Nd:YAG Laser FIG. 2 shows a first embodiment of the present invention. The laser system depicted is a multiple colour laser built around two Neodymium-doped Yttrium Lithium Fluoride (Nd:YLF) crystal ring oscillators I,II. Both oscillators are passively Q-switched and configured to generate $TEM_{00}$ single frequency radiation. Oscillator I is arranged to produce 1313 nm wavelength radiation and oscillator II is arranged to produce 1053 nm (or 1047 nm) wavelength radiation.

The Nd:YLF crystal 1 (e.g. rod of 4×95 mm size AR-coated for 1313 and 1053 nm) in oscillator I is preferably provided with tilted edges (of about 3°) to avoid parasitic excitation at 1053 nm. The Nd:YLF crystal 1a in oscillator II may however be provided with simply parallel edges. Both crystals are excited by a single linear xenon flashlamp 2 (typically of 5 mm bore diameter and 75 mm length) although other forms of pumping such as diodes could be used. Both pump chambers 3 have diffuse reflectors and liquid cooling circuits and are connected to synchronized laser power supplies 4.

The two ring laser cavities are very similar. Each consists of three ring cavity mirrors 5,6,7 comprising rear mirrors 6,7 and an output coupler 5. Typically, the reflectivity of the output coupler 5 is 80% in oscillator 1 and 45% in oscillator II. The optimal output coupler for the total 2 m cavity length was found to be meniscus with the radius of curvature of R=15 m. The return mirror 8 is used to suppress parasitic ring-cavity components although this could equally well be dealt with by any other non-reciprocal element such as an intracavity Faraday rotator coupled with a half waveplate or acousto-optic mirror. Element 9 is a Dove prism which improves the cavity stability against misalignment and also improves the beam structure by effecting a 180° field rotation at each pass through the cavity. An intracavity aperture 10 is used to suppress higher order transverse cavity modes. Two tilted Fabry-Perot etalons 11,12 act to suppress all but the required longitudinal cavity mode.

In oscillator I preferably a $YAG:V^{3+}$ passive Q-switch 13 is used (typically having initial transmission of $T_0=55\%$) although alternatively a passive Q-switch based on polymers with polymethine dyes, $Co^{2+}:LMA$, PbSe QD-doped phosphate glasses or an electro-optical Q-switch with feedback control could be used. In oscillator II a YAG:Cr passive Q-switch 13a is preferably used (typically having an initial transmission of $T_0=35-50\%$) although alternatively a passive Q-switch based on GSGG:Cr, LiF crystals or an electro-optical Q-switch with feedback control could be used. Both oscillators I,II could be realized equally well with a 5-mirror ring scheme instead of the 3-mirror scheme as depicted in FIG. 2. In oscillator I such a 5-mirror scheme would improve suppression of parasitic radiation at 1053 nm.

Mirrors 16 direct the radiation produced by each laser oscillator towards wavelength conversion sections of the laser system.

The output of oscillator I is deflected by transfer mirror 17 and is then directed to half waveplate 18 which rotates the laser beam polarization by 45° and lens 19 which focuses the radiation into a second harmonic crystal 20 for efficient conversion to 656.5 nm. Preferably, the second harmonic crystal 20 is a II type AR-coated KTP crystal (5×5×12 mm) inside a temperature stabilized oven. Alternatively, the KTP crystal could be replaced by LBO, BBO or $LiNbO_3$.

The beam continues through collimating lens 21 restoring initial polarization of 1313 nm after half waveplate 22 for efficient non-linear mixing of the frequencies 1313 nm and 656.5 nm. The beam continues to the focusing lens 23 which is used to improve the efficiency of conversion at the non-linear crystal 24 to the third harmonic. Preferably, the third harmonic crystal 24 is a I-type LBO crystal (3×3×20 mm) inside a temperature stabilized oven. Alternatively, the LBO crystal could be replaced by BBO or DKDP. However, DKDP has a significantly lower conversion efficiency. Both fundamental, second and third harmonics continue to the collimating lens 25. The dielectric mirror 26 reflects the remaining fundamental radiation at 1313 nm allowing only the required radiation at 656.5 nm (typically of energy E=3–4 mJ, duration of τ=60–90 ns) and 437.7 nm (typically of energy E=2.8–3.5 mJ, duration of τ=50–80 ns) to continue.

The output of oscillator II follows a similar but simpler route through the half waveplate 18, focusing lens 19 and the KTP second harmonic crystal 20. Preferably, the second harmonic crystal 20 is a II-type KTP crystal (5×5×10 mm) inside a temperature stabilized oven. The second harmonic crystal 20 produces radiation at 526.5 (523.6) nm. Alternatively, the KTP crystal could be replaced by LBO, BBO, DKDP. However, the conversion efficiency in the case of DKDP will be sufficiently lower. The beam is then collimated by collimating lens 21.

Dielectric mirror 27 is arranged so as to reflect only the required radiation at 526.5 nm (typically of energy E=4–8 mJ, duration of τ=30–50 ns) allowing the fundamental at 1053 nm (or 1047.1 nm) to continue into a beam block (not shown).

Laser power supplies 4 are synchronized through cable 28 to ensure synchronously or asynchronously emission at 526.5 (523.6) nm, 437.7 nm and 656.5 nm wavelength.

The radiation emissions at 526.5 (523.6) nm, 437.7 nm and 656.5 nm are now co-linear. For purposes of illustration of use, the RGB laser beam is shown passing into a simplified holographic set-up comprising mirror 29, spatial beam filter formed by positive lens 30 and pinhole 31, negative lens 32, beam splitter 33, object beam and reference beam mirrors 34,35 and holography plate 36.

Focusing and collimating lenses 19,21,23,25 could be changed to beam diameter compressing telescopes if non-linear frequency conversion crystals with rather critical angular phase-matching (e.g. DKDP, BBO) are used.

In an alternative embodiment the two Nd:YLF crystals 1,1a could be replaced by non-birefringent Neodymium-doped Yttrium Aluminium Garnet (Nd:YAG) crystals. However, for stable laser operation two additional intracavity elements would then be required, namely a thin Fabry-Perot etalon 14 (e.g. a quartz etalon of 45 µm thickness without dielectric coating) to suppress competitive generation of 1338 nm and a polarizer 15 to ensure the laser beams are linearly polarized at the output of oscillators I and II. In such a case oscillator I would be configured for 1064.2 nm wavelength generation and oscillator II would be configured for 1318.8 nm wavelength generation.

Nd:YAG is preferred for use as the active material for multi-colour laser operation at high-repetition rates (>5–7 Hz). This is because Nd:YAG is a higher gain material than Nd:YLF. As such, Nd:YAG requires less flashlamp pumping energy to attain the same population inversion. In addition Nd:YAG has a better thermal conductivity than Nd:YLF and so can conduct away heat faster and better than Nd:YLF, allowing it to tolerate more aggressive and faster pumping. However, Nd:YAG has a lower maximum stored energy than Nd:YLF and hence the output energy from the Nd:YAG oscillator is generally lower (for example at 659.4 nm typically E=2.5–3 mJ and at 439.6 nm E=2.0 mJ). Also, Nd:YAG has a much bigger thermal lens than Nd:YLF and so care must be exercised to optimize the curvature of the output coupler 5 for a particular repetition rate when using Nd:YAG.

The duration of the various chromatic laser pulses may be extended to approximately 150 ns by varying the respective cavity length, the initial transmission coefficients of the passive Q-switches, and the output cavity mirror reflectivities. Further increase of the duration of the respective chromatic Q-switched pulses up to approximately 400 ns may be accomplished by the insertion of $ZnP_2$ or $CdP_2$ crystal plates into the respective cavities (based upon the operational principle of photodarkening).

A Free Running (No Q-switching) Single-Stage Multiple Colour Nd:YLF/Nd:YAG Laser The laser system according to the first embodiment may be converted into a free-running laser having output emissions in the microsecond regime (typically of τ=10–100 µs pulse duration). This is useful in certain holographic applications. In order to convert the laser according to the first embodiment into such a free-running laser the Q-switches 13,13a may be removed and the lenses 19,21,23,25 changed to provide a higher energy density on each of the non-linear crystals thus assuring an adequate harmonic conversion efficiency.

Two Stage Single Frequency Single Mode Multiple Colour Nd:YLF/Nd:YAG Laser

Figure 3:
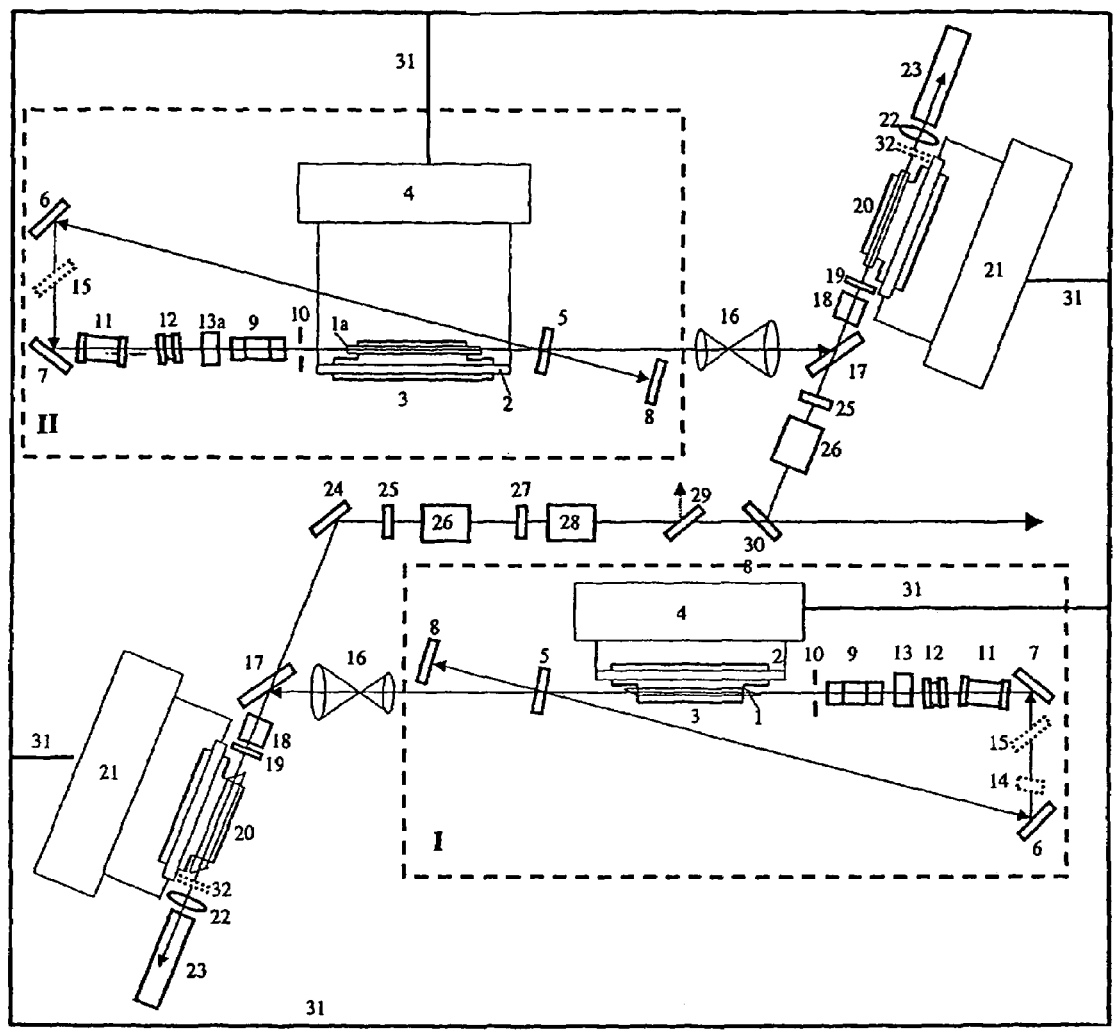
FIG. 3 shows a 2-stage multiple colour Nd:YLF/Nd:YAG laser according to a second embodiment of the present invention.

FIG. 3 shows a schematic diagram of a second embodiment of the present invention. The laser depicted is a multiple colour laser system built around two Neodymium-doped Yttrium Lithium Fluoride (Nd:YLF) crystal ring oscillators and two Neodymium-doped Yttrium Lithium Fluoride (Nd:YLF) amplifiers. The oscillators I,II are identical to those described in relation to the first embodiment. Hence, as before, Oscillator I is configured for 1313 nm generation and oscillator II is configured for 1053 nm (or 1047.1 nm) generation.

The output of each oscillator I,II is directed into a telescope 16 in order to match each pump beam to the cross-sectional size of the amplifier. The two two-pass amplifiers 17,18,19,20,21,22,23 are schematically identical although the individual optical components are designed for operation at different wavelengths. Each amplifier comprises a thin film dielectric polarizer 17, a Faraday Rotator 18, a 45° polarization rotator 19, an amplifier pump chamber with Nd:YLF laser rod, a linear Xenon flashlamp and diffuse reflector 20, an amplifier power supply 21, a focusing lens 22 and a Stimulated Brillouin Scattering (SBS) phase conjugate mirror 23. Preferably, the amplified associated with Oscillator I has tilted edges.

The use of a phase-conjugated mirror 23 in the double-pass amplifier design allows the formation of a diffraction-limited beam by compensation of the aberrations in the wavefront which are induced in the first pass by the temperature gradients in the amplifier rod. In addition, it improves the transverse beam structure allowing the amplifier active element to be pumped more strongly towards its edges without the generation of unwanted diffractive rings. This is because the SBS mirror 23 acts as a beam apodizer, smoothing the sharp edges of the incoming laser beam owing to lower mirror reflectivity. Greater energy extraction is also possible with a double-pass amplifier scheme without self-excitation. The SBS mirror 23 serves as a selective reflector which reflects only a coherent signal and not the noise from any amplified spontaneous emission. This is particularly important for efficient amplification of the weaker 1313 nm Nd laser transition.

Amplified radiation from oscillator I (1313 nm) is then deflected by mirror 24 through half waveplate 25 onto the nonlinear crystal 26 for generation of the second harmonic (here either II-type KTP or BBO, LBO, LiNbO$_3$ crystal may be used) at 656.5 nm. The beam then travels through half waveplate 27 to another nonlinear crystal 28 for the generation of the third harmonic (here either I-type LBO or BBO, DKDP or any other suitable crystal may be used) at 437.7 nm. The dielectric mirror 29 is now used to remove the unwanted radiation at 1313 nm.

Amplified radiation from oscillator II (at 1053 nm or 1047.1 nm) propagates through half waveplate 25 onto the nonlinear crystal 26 for generation of the second harmonic (here either II-type KTP or BBO, LBO, DKDP crystal may be used) at 526.5 nm or 523.6 nm. The dielectric mirror 30 transmits the unwanted radiation at 1053 or 1047.1 nm and combines the radiation at 656.5 nm and 437.7 nm with the radiation at 526.5 nm (or 523.6 nm) thus producing a high energy output beam of multiple colour radiation.

As in preceding section, laser power supplies 4,21 are synchronized through cable 31 to ensure efficient amplification of laser pulses and synchronously or asynchronously emission at 526.5 (523.6) nm, 437.7 nm and 656.5 nm wavelength radiation.

In an alternative embodiment the four Nd:YLF crystals may be replaced by non-birefringent Neodymium-doped Yttrium Aluminium Garnet (Nd:YAG) crystals. The oscillators are otherwise identical to those described above. As before, oscillator I is configured for 1064.2 nm wavelength generation and oscillator II is configured for 1318.8 nm wavelength radiation generation. Because non-birefringent Nd:YAG crystals amplify equally well both orthogonal laser beam polarizations, the two-pass phase conjugated amplifiers may be simplified by replacing the Faraday rotators 18 and 45° polarization rotators 19 with quarter waveplates 32. However, for higher repetition rates (>5–7 Hz) Nd:YAG amplifiers possess a high depolarization component that could damage the oscillator and which needs to be suppressed by using Faraday isolators.

An Actively Q-switched Single Frequency Multiple Colour Nd:YLF/Nd:YAG Laser

Figure 4:
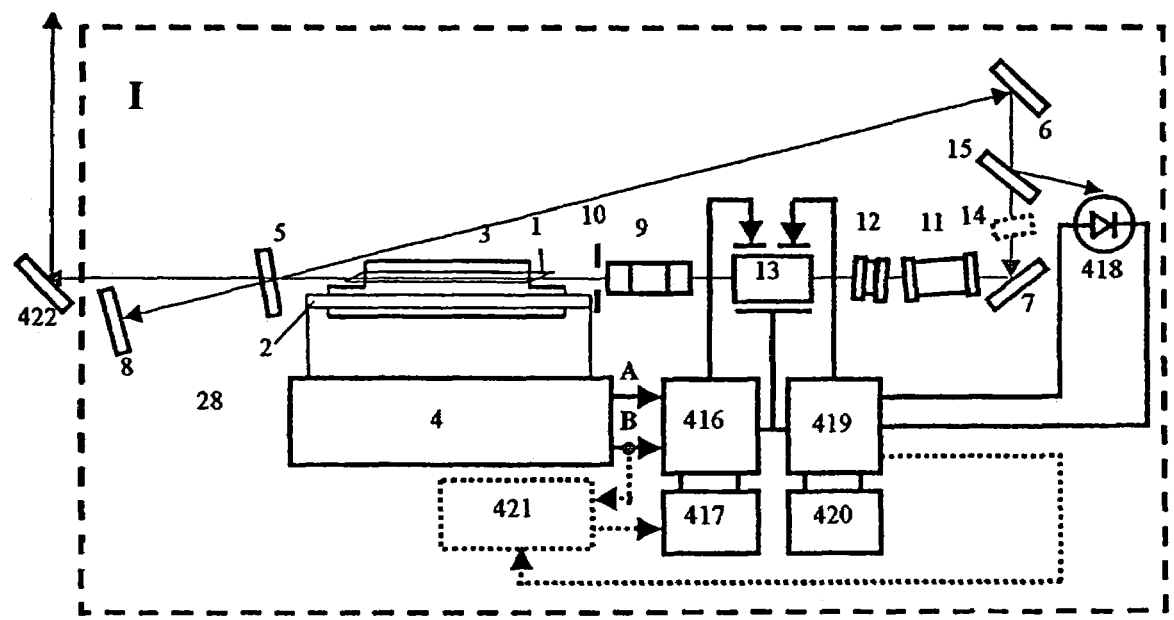
FIG. 4 shows an actively Q-switched single-stage single-frequency multiple colour Nd:YLF/Nd:YAG laser according to a third embodiment of the present invention.

FIG. 4 shows an Oscillator I of a multiple colour actively Q-switched laser system built around a Neodymium-doped Yttrium Lithium Fluoride (Nd:YLF) crystal. Not shown in FIG. 4 is a second Oscillator II which is identical to the Oscillator I except that the optical components are designed and manufactured for use at a different wavelength. Also not shown in FIG. 4 are amplification, harmonic generation and beam combination schemes which are preferably identical to those described above (e.g. elements 16–28 according to the first embodiment and elements 16–32 according to the second embodiment). The actively Q-switched oscillators I,II are configured to generate TEM$_{00}$ single frequency radiation for 1313 nm and 1053 nm (or 1047 nm) wavelength generation. Active Q-switching permits higher output energies to be achieved from the oscillator at the same flashlamp pumping energy as in the case of passive Q-switching. Furthermore, active Q-switching ensures low temporal jitter between the electrical synchronization pulse and the laser emission pulse. The typical output energy from the oscillator at 656.5 nm is E=5–6 mJ, and at 437.7 nm is up to E=4–5 mJ.

The active Q-switch is formed by a Pockels cell 13 and polarizer 15. High voltage (typically 5–7 kV) is applied to the Pockels cell 13 by an Electro-Optical driver 416 fed by an HV power supply 417 which ensures large initial optical losses in the cavity starting from the flashlamp 2 triggering (signal A) by laser power supply 4. Typically, Pockels cell 13 is made from a LiTaO$_3$ crystal with three attached gold electrodes. DKDP and LiNbO$_3$ could alternatively be used, although DKDP has larger absorption losses and LiNbO$_3$ has a lower damage threshold.

Whilst the flashlamp discharge takes place, the population inversion grows in the Nd:YLF active laser medium. The first spontaneously generated free-running spike is reflected by polarizer 15 to photosensitive diode 418 (e.g. a fast Ge photodiode or InGaAs PIN diode for 1313 nm wavelength radiation; fast Si photodiode for 1053 or 1047.1 nm wavelength radiation) which triggers Prelasing Control driver 419 which is fed by the HV power supply 420. As a result, additional voltage (typically 0.5–1 kV) is variably applied to the Pockels cell 13 depending on the intensity of the free-running radiation. Thus a negative feedback loop is formed thereby providing quasi-CW generation inside the cavity from the moment the first free-running spike appears.

After sufficient quasi-CW generation development time (typically of 20–50 μs) the single longitudinal mode is formed inside the laser cavity and propagates. When the laser power supply 4 produces another Electro-Optical triggering pulse (signal B), the voltage applied by Electro-Optical driver 416 to the Pockels Cell 13 is removed and a Q-switched pulse (of ns duration range) is generated. Delay between flashlamp triggering pulse (signal A) and Electro-Optical triggering pulse (signal B) is optimized for the highest output energy from the oscillator (typically set of 120–200 μs).

An additional stabilization driver 421 can be employed to avoid any sensitivity to the decay of the flashlamp with time. This ensures long-life stable single longitudinal mode generation. Stabilisation driver 421 measures the delay between the moment the first free-running spike appears and the Electro-Optical triggering pulse (signal B) and keeps this interval unchanged by driving the voltage of HV Power Supply 417.

In an alternative embodiment, the Nd:YLF crystal in each oscillator I,II may be replaced by a non-birefringent Neodymium-doped Yttrium Aluminium Garnet (Nd:YAG) crystal. However, for stable laser operation an additional intracavity thin Fabry-Perot etalon 14 (e.g. quartz etalon of 45 μm thickness without dielectric coating) is required to suppress competitive generation of 1338 nm.

Alternative Embodiments

In all the embodiments described above the non-linear frequency doubling and frequency trebling crystals are placed outside of the ring oscillator. However, alternative embodiments are contemplated wherein in relation to each of the embodiments described above, one or more of the non-linear crystals could be placed within the ring oscillator cavity.

Since the radiation intensity within the cavity is much larger than outside the cavity, the internal placement of the frequency conversion crystals leads to a higher harmonic conversion efficiency. Thus for the same pumping energy the RGB output can in principle be higher.

Holographic Printing Devices

The above embodiments describe RGB laser systems that may, amongst other things, be incorporated into a holographic printer. Holographic printers are devices that print 3-D pictures or holograms onto a special substrate. Full colour reflection holograms that may be viewed in white light are of particular commercial interest.

Holographic printers can be broadly divided into two categories. The first category pertains to 2-step or "Master-Write" holographic printers. The second category pertains to 1-step or "Direct-Write" holographic printers. Both categories of printers are discussed in more detail in WO01/45943 (D. Brotherton-Ratcliffe et al.).

Direct-Write or 1-Step Holographic Printers

Figure 5:
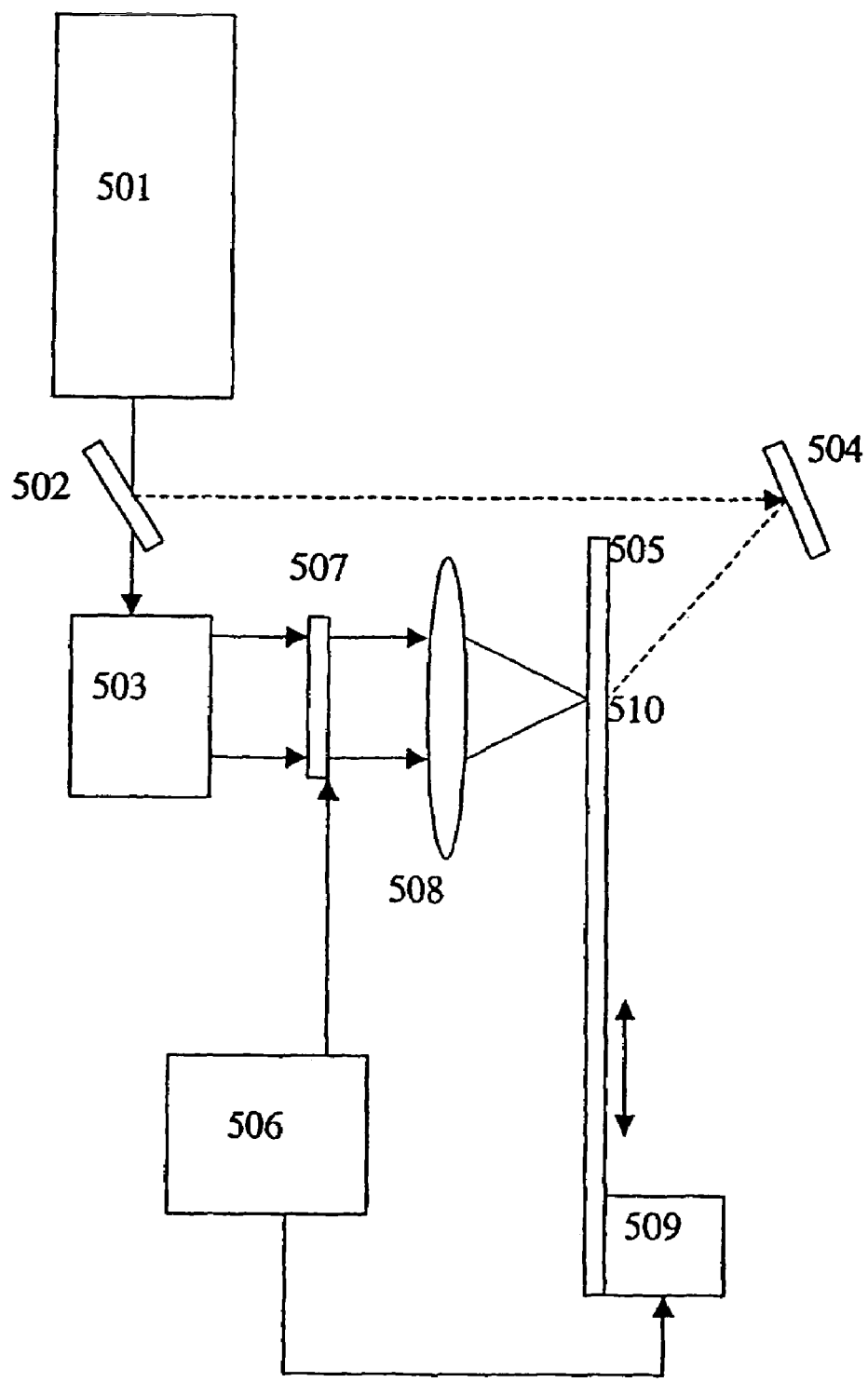
FIG. 5 shows a 1-step or "Direct-Write" holographic printer.

FIG. 5 shows a basic schematic for a 1-step or "Direct-Write" holographic printer. An RGB laser 501 emits visible laser radiation that is split into an object and reference beam by the beam splitter 502. The object beam continues to a beam preparation system 503 where the beam is expanded, cleaned and otherwise generally prepared in order that it may illuminate the spatial light modulator (SLM) 507 onto which a computer 506 is used to display digitally processed image data. The transmitted radiation passing through SLM 507 is then focused using a special lens system onto a small zone at 510 on the recording material 505. The reference beam co-illuminates this same location 510, having been directed there by a mirror 504. The recording material is moved in a two-dimensional fashion by a servomotor system 509 and a holographic pixel is formed at location 510 each time a laser exposure is made. The specially transformed digital image data is changed at each exposure. In this way a composite hologram that is directly viewable in white light (after processing) may be built up pixel by pixel by directly writing digital data onto the hologram.

Master-Write or 2-Step Holographic Printers

This type of holographic printer produces an intermediate hologram that must then be transferred or converted into a final white-light viewable hologram. The intermediate hologram is usually referred to as an "H1" hologram or as a "master" hologram. H1 or master holograms are usually transmission holograms but may also be reflection holograms. Without exception they contain images that possess a different optical plane than desired for the final hologram and hence require optical transfer to generate a second hologram possessing the correct optical plane. They may be generated by traditional analogue means or more preferably they may be generated digitally.

An intermediate H1 hologram may most easily be generated digitally by a scheme similar to that shown in FIG. 5, the only difference being that the image data is treated fundamentally differently to image data used in 1-step holograms. The characteristics of various critical optical elements and the definition of various operational parameters may also be rather different.

Figure 6:
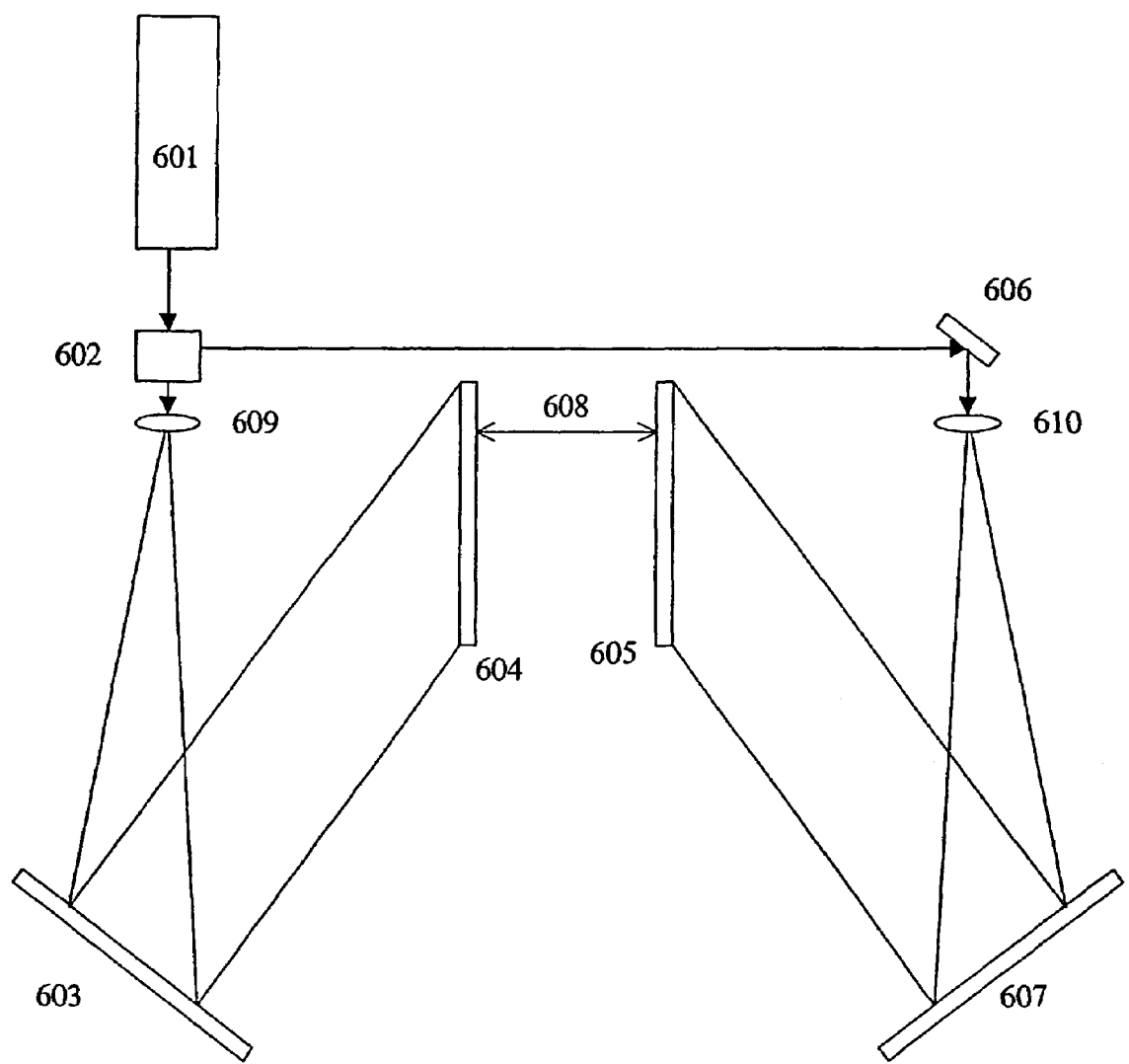
FIG. 6 shows an arrangement for producing a final white-light viewable hologram from a master or H1 hologram.

In order to produce a final white-light viewable hologram from a master or H1 hologram, the H1 hologram must be optically transferred as shown, for example, in FIG. 6. Laser radiation is produced by an RGB laser 601 which is then divided, as before, into object and reference beams by the splitter 602. The object beams-then expanded by the lens 609 before being reflected by the off-axis parabolic mirror 603 onto the processed H1 hologram 604. An unexposed holographic plate 605 is now placed at a distance 608 (the required correction distance for the optical plane) from the H1 and is illuminated by the first order diffracted radiation produced by the H1. In addition to this object illumination the unexposed holographic plate is illuminated by a reference beam formed by the off-axis parabolic mirror 607, expanding lens 610 and directing mirror 606. In this way the master or H1 hologram is transferred to a white-light viewable hologram which is also referred to as an "H2" hologram.

The invention claimed is:

1. A direct write holographic printer comprising:
   a pulsed multiple colour laser system to produce a laser beam, said laser beam being split into an object beam and a reference beam, which is mutually coherent with said object beam;
   a spatial light modulator wherein, in use, said object beam illuminates said spatial light modulator; and
   a lens system for writing a holographic pixel of a hologram on to a photosensitive medium, said lens system being arranged downstream of said spatial light modulator;
   wherein said pulsed multiple colour laser system comprises:
   a first active laser element provided in a first laser cavity, said first active laser element comprising Nd:YLF and wherein said first active laser element is arranged to generate laser radiation at a first fundamental frequency with a wavelength of 1313 nm;
   means for arranging the laser mode within said first laser cavity to be single longitudinal mode;
   means for frequency doubling said laser radiation at said first fundamental frequency to provide laser radiation at a first frequency doubled frequency with a wavelength of 656.5 nm;
   means for frequency trebling said laser radiation at said first fundamental frequency to provide laser radiation at a first frequency trebled frequency with a wavelength of 437.7 nm;
   a second active laser element provided in a second laser cavity separate from said first laser cavity, said second active laser element comprising Nd:YLF and wherein said second active laser element is arranged to generate laser radiation at a second fundamental frequency with a wavelength of 1053 nm or 1047.1 nm;
   means for frequency doubling said laser radiation at said second fundamental frequency to provide laser radiation at a second frequency doubled frequency with a wavelength of 526.5 nm or 523.6 nm; and
   means for arranging the laser mode within said second laser cavity to be single longitudinal mode.

2. A direct write holographic printer as claimed in claim 1, wherein the output of said pulsed multiple colour laser system comprises:
   laser radiation at said first frequency doubled frequency;
   laser radiation at said first frequency trebled frequency; and
   laser radiation at said second frequency doubled frequency.

3. A direct write holographic printer as claimed in claim 1, further comprising an active or passive Q-switch provided in said first laser cavity.

4. A direct write holographic printer as claimed in claim 1, further comprising an active or passive Q-switch provided in said second laser cavity.

5. A direct write holographic printer as claimed in claim 1, further comprising a flashlamp for flashlamp pumping said first active laser element.

6. A direct write holographic printer as claimed in claim 1, further comprising a flashlamp for flashlamp pumping said second active laser element.

7. A direct write holographic printer as claimed in claim 1, further comprising means for arranging a laser mode within said first laser cavity to be $TEM_{00}$.

8. A direct write holographic printer as claimed in claim 1, further comprising means for arranging a laser mode within said second laser cavity to be $TEM_{00}$.

9. A direct write holographic printer as claimed in claim 1, wherein said first and second active laser elements are provided either: (i) in separate ring oscillators; (ii) in separate linear cavities; or (iii) with one active laser element in a ring oscillator and one active laser element in a linear cavity.

10. A direct write holographic printer as claimed in claim 1, further comprising a Nd:YLF amplifier.

11. A direct write holographic printer as claimed in claim 1, wherein said means for frequency doubling said laser radiation at said first fundamental frequency is provided within said first laser cavity.

12. A direct write holographic printer as claimed in claim 1, wherein said means for frequency trebling said laser radiation at said first fundamental frequency is provided within said first laser cavity.

13. A direct write holographic printer as claimed in claim 1, wherein said means for frequency doubling said laser radiation at said second fundamental frequency is provided within said second laser cavity.

14. A direct write holographic printer as claimed in claim 1, further comprising means for combining said laser radiation at said first frequency doubled frequency, said laser radiation at said first frequency trebled frequency and said laser radiation at said second frequency doubled frequency into a co-linear or non co-linear laser beam.

15. A direct write holographic printer comprising:
a pulsed multiple colour laser system to produce a laser beam, said laser beam being split into an object beam and a reference beam, which is mutually coherent with said object beam;
a spatial light modulator wherein, in use, said object beam illuminates said spatial light modulator; and
a lens system for writing a holographic pixel of a hologram on to a photosensitive medium, said lens system being arranged downstream of said spatial light modulator;
wherein said pulsed multiple colour laser system comprises:
a first active laser element provided in a first laser cavity, said first active laser element comprising Nd:YAG and wherein said first active laser element is arranged to generate laser radiation at a first fundamental frequency with a wavelength of 1318.8 nm;
means for arranging the laser mode within said first laser cavity to be single longitudinal mode;
means for frequency doubling said laser radiation at said first fundamental frequency to provide laser radiation at a first frequency doubled frequency with a wavelength of 659.4 nm;
means for frequency trebling said laser radiation at said first fundamental frequency to provide laser radiation at a first frequency trebled frequency with a wavelength of 439.6 nm;
a second active laser element provided in a second laser cavity separate from said first laser cavity, said second active laser element comprising Nd:YAG and wherein said second active laser element is arranged to generate laser radiation at a second fundamental frequency with a wavelength of 1064.2 nm;
means for frequency doubling said laser radiation at said second fundamental frequency to provide laser radiation at a second frequency doubled frequency with a wavelength of 532.1 nm; and
means for arranging the laser mode within said second laser cavity to be single longitudinal mode.

16. A direct write holographic printer as claimed in claim 15, wherein the output of said pulsed multiple colour laser system comprises:
laser radiation at said first frequency doubled frequency;
laser radiation at said first frequency trebled frequency; and
laser radiation at said second frequency doubled frequency.

17. A direct write holographic printer as claimed in claim 15, further comprising an active or passive Q-switch provided in said first laser cavity.

18. A direct write holographic printer as claimed in claim 15, further comprising an active or passive Q-switch provided in said second laser cavity.

19. A direct write holographic printer as claimed in claim 15, further comprising a flashlamp for flashlamp pumping said first active laser element.

20. A direct write holographic printer as claimed in claim 15, further comprising a flashlamp for flashlamp pumping said second active laser element.

21. A direct write holographic printer as claimed in claim 15, further comprising means for arranging a laser mode within said first laser cavity to be $TEM_{00}$.

22. A direct write holographic printer as claimed in claim 15, further comprising means for arranging a laser mode within said second laser cavity to be $TEM_{00}$.

23. A direct write holographic printer as claimed in claim 15, wherein said first and second active laser elements are provided either: (i) in separate ring oscillators; (ii) in separate linear cavities; or (iii) with one active laser element in a ring oscillator and one active laser element in a linear cavity.

24. A direct write holographic printer as claimed in claim 15, further comprising a Nd:YAG amplifier.

25. A direct write holographic printer as claimed in claim 15, wherein said means for frequency doubling said laser radiation at said first fundamental frequency is provided within said first laser cavity.

26. A direct write holographic printer as claimed in claim 15, wherein said means for frequency trebling said laser radiation at said first fundamental frequency is provided within said first laser cavity.

27. A direct write holographic printer as claimed in claim 15, wherein said means for frequency doubling said laser radiation at said second fundamental frequency is provided within said second laser cavity.

28. A direct write holographic printer as claimed in claim 15, further comprising means for combining said laser radiation at said first frequency doubled frequency, said laser radiation at said first frequency trebled frequency and said laser radiation at said second frequency doubled frequency into a co-linear or non co-linear laser beam.

29. A method of directly writing a hologram comprising:
providing a pulsed multiple colour laser system arranged to produce a laser beam;
splitting said laser beam into an object beam and a reference beam, which is mutually coherent with said object beam;
illuminating a spatial light modulator with said object beam; and
providing a lens system downstream of said spatial light modulator for writing a holographic pixel of a hologram on to a photosensitive medium;
wherein said pulsed multiple colour laser system comprises a first active laser element provided in a first laser cavity, said first active laser element comprising Nd:YLF and a second active laser element provided in a second laser cavity separate from said first laser cavity, said second active laser element comprising Nd:YLF; and wherein said pulsed multiple colour laser system produces said laser beam by:

arranging for said first active laser element to generate laser radiation at a first fundamental frequency with a wavelength of 1313 nm;

arranging for the laser mode within said first laser cavity to be single longitudinal mode;

frequency doubling said laser radiation at said first fundamental frequency to provide laser radiation at a first frequency doubled frequency with a wavelength of 656.5 nm;

frequency trebling said laser radiation at said first fundamental frequency to provide laser radiation at a first frequency trebled frequency with a wavelength of 437.7 nm;

arranging for said second active laser element to generate laser radiation at a second fundamental frequency with a wavelength of 1053 nm or 1047.1 nm;

frequency doubling said laser radiation at said second fundamental frequency to provide laser radiation at a second frequency doubled frequency with a wavelength of 526.5 nm or 523.6 nm; and arranging for the laser mode within said second laser cavity to be single longitudinal mode.

30. A method of directly writing a hologram comprising:

providing a pulsed multiple colour laser system arranged to produce a laser beam;

splitting said laser beam into an object beam and a reference beam, which is mutually coherent with said object beam;

illuminating a spatial light modulator with said object beam; and providing a lens system downstream of said spatial light modulator for writing a holographic pixel of a hologram on to a photosensitive medium;

wherein said pulsed multiple colour laser system comprises a first active laser element provided in a first laser cavity, said first active laser element comprising Nd:YAG, and a second active laser element provided in a second laser cavity separate from said first laser cavity, said second active laser element comprising Nd:YAG; and wherein said pulsed multiple colour laser system produces said laser beam by:

arranging for said first active laser element to generate laser radiation at a first fundamental frequency with a wavelength of 1318.8 nm;

arranging for the laser mode within said first laser cavity to be single longitudinal mode;

frequency doubling said laser radiation at said first fundamental frequency to provide laser radiation at a first frequency doubled frequency with a wavelength of 659.4 nm;

frequency trebling said laser radiation at said first fundamental frequency to provide laser radiation at a first frequency trebled frequency with a wavelength of 439.6 nm;

arranging for said second active laser element to generate laser radiation at a second fundamental frequency with a wavelength of 1064.2 nm;

frequency doubling said laser radiation at said second fundamental frequency to provide laser radiation at a second frequency doubled frequency with a wavelength of 532.1 nm; and arranging for the laser mode within said second laser cavity to be single longitudinal mode.

* * * * *